Jan. 10, 1967  J. E. RICHARDSON  3,297,060
WIRE SPLICER
Filed April 29, 1964

INVENTOR.
JACOB E. RICHARDSON
BY
*Lockwood, Woodard, Smith & Weikart*
Attorneys

United States Patent Office 3,297,060
Patented Jan. 10, 1967

3,297,060
WIRE SPLICER
Jacob E. Richardson, R.R. 3, Box 137, Peru, Ind. 46970
Filed Apr. 29, 1964, Ser. No. 363,552
4 Claims. (Cl. 140—122)

The present invention relates to a wire splicing tool.

It is frequently necessary on the farm and other places where fencing is used to join the wires of the fencing both for repair of the fencing and while initially erecting fencing. As is well known, fencing is available in certain lengths. After a given length has been erected, it is necessary to join it with the following length or else a portion of the fencing will be wasted. It is particularly desirable that the two ends of the wire being joined be secured together with each wire being coiled about the other. It is the present practice by most persons to use a pair of pliers for this purpose although this method has not been found to be completely satisfactory.

Consequently, it is an object of the present invention to provide an improved tool for joining wires.

Another object of the present invention is to provide a tool for joining wires which tool is easily adjusted to receive the wires and requires only relatively simple motions to join the wires.

A further object of the present invention is to provide a tool for joining wires which automatically locks the wires in the tool during the joining operation.

Related objects and advantages will become apparent as the description proceeds.

The full nature of the invention will be understood from the accompanying drawings and the following description and claims.

Figure 1:
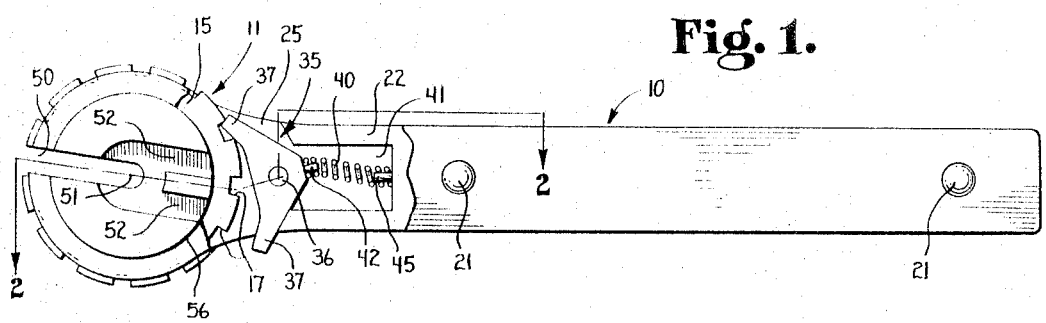
FIG. 1 is a side elevation of a wire splicer embodying the present invention with certain portions of the splicer broken away to show certain internal structure of the device.

For the purposes of promoting an understanding of the principles of the invention, reference will now be made to the embodiment illustrated in the drawing and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a wire splicer including a handle 10 and a head 11. The head 11 has a generally cylindrical shape 12 which approximately midway thereof has an integral annular radially outwardly projecting portion 15 formed with ratchet teeth 16. The ratchet teeth 16 have radially extending surfaces 17 on the opposite pawl-engaging faces whereby the head 11 can be caused to ratchet in either one direction or the other.

The handle 10 is made up of a pair of elongated plate elements 20 fixed together by rivets 21 with a spacer 22 therebetween. The head 11 is rotatably received at one end 25 of the handle 10 with the ratchet teeth-carrying annular portion 15 being received between the two plates 20 and the generally cylindrical shape 12 of the head projecting through a pair of circular openings 26 in the respective plates 20.

The handle 10 is provided with a pair of aligned slots 30 in each of the plates 20, said slots extending from the outer periphery of the one end 25 of the handle into the respective circular openings 26 in the one end of the handle. The slots 30 function to pass a wire 31 through the one end 25 of the handle into the head 11. A pawl member or element 35 is pivotally mounted in the handle between the two plate elements 20 by means of a pin 36. The pawl element 35 has a generally triangular shape with two of the apices of the triangular shape forming pawls 37 which alternatively engage the ratchet teeth 16 to block rotation of the head 11 relative to the handle in one direction or the other. A compression spring 40 is received with the handle within a recess 41 in the spacer 22. The pawl element 35 has a small projection 42 which receives one end of the spring 40. The other end of the spring 40 is received upon a small projection 45 extending into the recess 41. The spring 40 causes the pawl element 35 to have a toggle action so that the ratchet can be blocked against rotation in one direction or the other by pushing one of the pawls 37 or the other against the ratchet teeth.

Figures 2, 3:
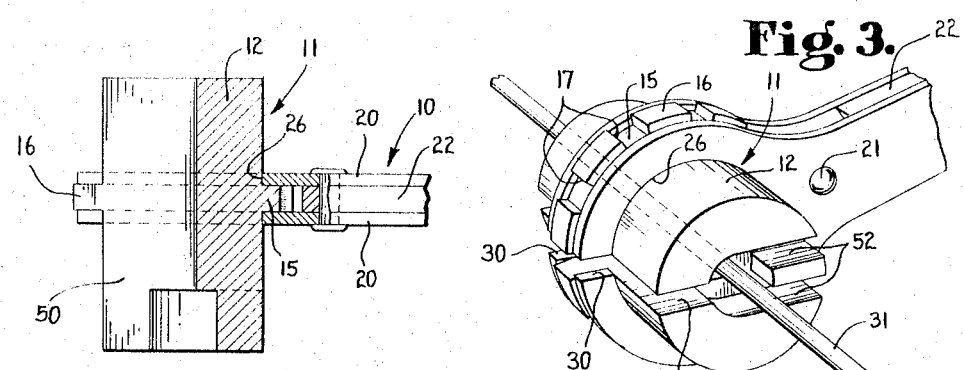
FIG. 2 is a section taken along the line 2—2 of FIG. 1 in the direction of the arrows.
FIG. 3 is a fragmentary perspective view of the wire splicer of FIG. 1.

The head 11 has a first slot 50 which extends the complete length of the head radially through the cylindrical shape 12 and which includes the axis 51 of the head 11. The slot 50 may be aligned with the slots 30 as in FIG. 3 to permit passage of one of the wires to be joined through the two slots to the axis of the head.

The head 11 has a further pair of slots 52 which are located adjacent one end 55 of the cylindrical shape and which extend parallel to one another and to the first slot 50. Each of the two slots 52 extends from the outer periphery 56 of the cylindrical shape past the axis 51 thereof and curves into the first slot 50 at a radius to the axis 51.

Figure 4:
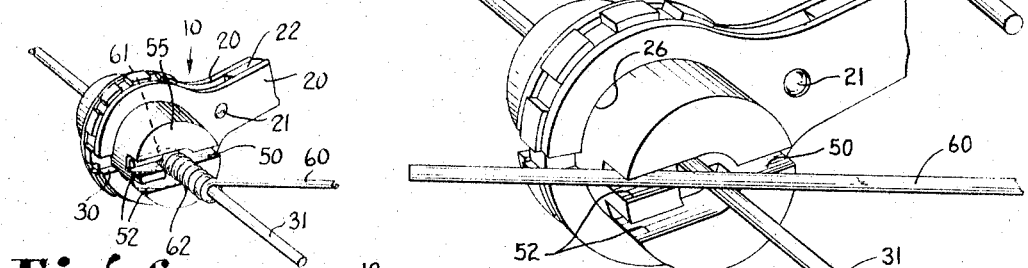
FIGS. 4, 5 and 6 are views similar to FIG. 3 but showing the wire splicer in different operating positions.
Figures 5, 6:
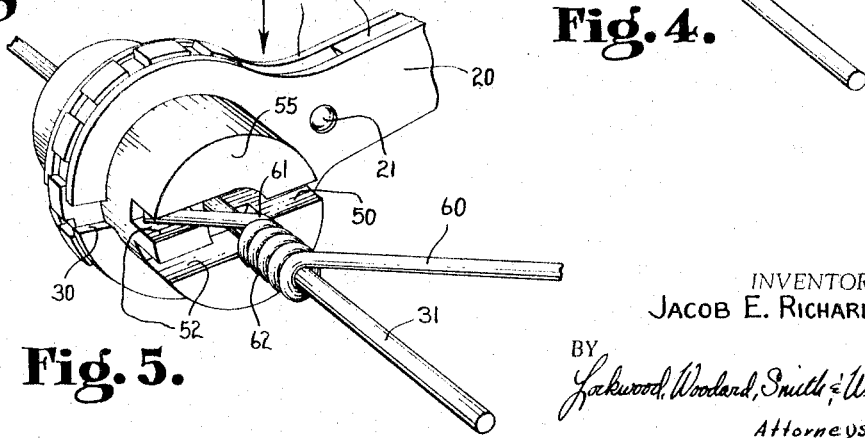

In order to join the wire 60 to the wire 31, the wire 60 is laid within one of the slots 52 depending upon the direction the wire 60 is to be wound about the wire 31. In the arrangement illustrated in FIG. 4, the wire 60 is to be wound in a counterclockwise direction about the wire 31. The pawl element 35 is adjusted to the position of FIG. 1 and the handle 10 is repeatedly raised upwardly and lowered downwardly causing the wire 60 to be twisted about the wire 31 and producing the result shown in FIG. 5. During actual operation of the device, the end 61 of the twisted portion 62 of the wire 60 would, of course, be received within the slot 52 adjacent the slot 50 as shown in FIG. 6.

After the coil 62 has been completed, it may be desired to coil the wire 31 about the wire 60. This is accomplished in the same manner as above described by first turning over the tool, then inserting the wire 60 into the head 11 and through the slots 30 and 50 to the axis 51 of the head. The coiling operation is then completed as described.

From the above description, it will be evident that the present invention provides an improved tool for joining wires, said tool being easily adjusted to receive the wires and requiring only relatively simple motions to join the wires. It has also been found that the present tool does not damage or cut off either of the ends of the two wires during the joining operation but instead provides a smooth firm connection. It will also be evident that the tool of the present invention provides means for automatically locking the wire within the tool during the joining operation by reason of the fact that the slots 30 move out of alignment with the slot 50 so that the wire 31 cannot slip out of the tool.

While the invention has been illustrated and described in detail in the drawings and foregoing description, the same it to be considered as illustrative and not restrictive in character, it being understood that only the preferred embodiment has been shown and described and that all changes and modifications that come within the spirit of the invention and the scope of the claims are also desired to be protected.

The invention claimed is:

1. A wire splicing tool comprising a handle, a head rotatably mounted on said handle at one end thereof, said head having a cylindrical shape with a radially projecting annular portion formed integrally of said head and located generally centrally of the outer periphery of said cylindrical portion, said annular portion having ratchet teeth thereon each of which has radially extending surfaces on the opposite pawl-engaging faces thereof, said handle including a pair of elongated plate elements each of which has a circular opening therethrough at the one end of said handle, said annular portion of said head being nested between said plate elements with said cylindrical shape of said head projecting through said circular openings, said handle having aligned slots each through a respective plate element and leading into said circular openings for passing a wire through said handle into said head, a pawl member pivotally mounted in said handle between said elongated plate elements, said pawl member having a generally triangular shape with two of the apices of said triangular shape forming pawls alternatively engageable with said ratchet teeth to block rotation of said head relative to said handle in one direction or the other, a compression spring received within said handle and acting between said handle and the third apex of said triangular shape with a toggle action to urge one of said pawl portions and alternatively the other of said pawl portions into engagement with said ratchet teeth, said head having a first slot extending radially through said annular portion and radially through said cylindrical shape the complete length of the cylindrical shape and to include the axis of said cylindrical shape, said head having a further pair of slots at one end of said cylindrical shape and extending parallel to one another and to said first slot and extending oppositely away from said axis to said first slot, each of said slots of said pair of slots having straight portions extending from the outside of said cylincal shape in a path spaced from the axis thereof and having surfaces which curve into said first slot at a radius to said axis, said head having a counterbore about said axis at said one end of the head to provide the curving surfaces of the further pair of slots, said straight portions being tangent to said carrying surfaces.

2. A wire splicing tool comprising a handle, a head rotatably mounted on said handle at one end thereof, said head having a cylindrical shape with a radially projecting annular portion formed integrally of said head, said annular portion having a ratchet teeth thereon, said handle including a pair of elongated plate elements each of which has a circular opening therethrough at the one end of said handle, said annular portion of said head being nested between said plate elements with said cylindrical shape of said head projecting through said circular openings, said handle having aligned slots each through a respective plate element and leading into said circular openings for passing a wire through said handle into said head, a pawl member pivotally mounted in said handle between said elongated plate elements, said pawl member having a generally triangular shape with two of the apices of said triangular shape forming pawls alternatively engageable with said ratchet teeth to block rotation of said head relative to said handle in one direction or the other, a compression spring received within said handle and acting between said handle and the third apex of said triangular shape with a toggle action to urge one of said pawl portions and alternatively the other of said pawl portions into engagement with said ratchet teeth, said head having a first slot extending radially through said annular portion and radially through said cylindrical shape the complete length of the cylindrical shape and to include the axis of said cylindrical shape, said head having a further pair of slots at one end of said cylindrical shape and extending parallel to one another and to said first slot and extending oppositely away from said axis to said first slot, each of said slots of said pair of slots having straight portions extending from the outside of said cylindrical shape in a path spaced from the axis thereof and having surfaces which curve into said first slot at a radius to said axis, said head having a counterbore about said axis at said one end of the head to provide the curving surfaces of the further pair of slots, said straight portions being tangent to said curving surfaces.

3. A wire splicing tool comprising a handle, a head rotatably mounted on said handle at one end thereof, said head having a cylindrical shape with a radially projecting annular portion formed integrally of said head and located midway of the outer periphery of said cylindrical portion, said annular portion having ratchet teeth thereon, said handle including a pair of projecting portions each of which has a circular opening therethrough at the one end of said handle, said annular portion of said head being nested between said projecting portions with said cylindrical shape of said head projecting through said circular openings, said handle having aligned slots each through a respective projecting portion and leading into said circular openings for passing a wire through said handle into said head, a pawl member mounted in said handle, spring means received within said handle and acting between said handle and said pawl to urge it into engagement with said ratchet teeth, said head having a first slot extending radially through said annular portion and radially through said cylindrical shape the complete length of the cylindrical shape and to include the axis of said cylindrical shape, said head having a further pair of slots at one end of said cylindrical shape and extending parallel to one another and to said first slot and extending oppositely away from said axis to said first slot, each of said slots of said pair of slots having straight portions extending from the outside of said cylindrical shape in a path spaced from the axis thereof and having surfaces which curve into said first slot at a radius to said axis, said head having a counterbore about said axis at said one end of the head to provide the curving surfaces of the further pair of slots, said straight portions being tangent to said curving surfaces.

4. A wire splicing tool comprising a handle, a cylindrical head rotatably mounted on said handle at one end thereof, said head having ratchet teeth thereon, said handle including a pair of projecting portions each of which has a circular opening therethrough at the one end of said handle, said teeth of the head being nested between said projecting portions with said head projecting through said circular openings, said handle having aligned slots each through a respective projecting portion and leading into said circular openings for passing a wire through said handle into said head, a pawl mounted in said handle and in ratcheting engagement with said teeth, said head having a first slot extending radially through said head the complete length of the head to include the axis of said head, said head having a further pair of slots at one end thereof and extending parallel to one another and to said first slot and extending oppositely away from said axis to said first slot, each of said slots of said pair of slots having straight portions extending from the outside of said head in a path spaced from the axis thereof and having surfaces which curve into said first slot at a radius to said axis, said head having a counterbore about said axis at said one end of the head to provide the curving surfaces of said further pair of slots, said straight portions being tangent to said curving surfaces.

References Cited by the Examiner

UNITED STATES PATENTS

| | | | |
|---|---|---|---|
| 1,073,514 | 9/1913 | Pennington | 140—122 |
| 1,651,210 | 11/1927 | Kersey | 140—122 |
| 1,861,308 | 5/1932 | Goldenstar | 140—119 |

CHARLES W. LANHAM, *Primary Examiner.*

L. A. LARSON, *Assistant Examiner.*